(12) United States Patent
Sardo

(10) Patent No.: US 10,605,293 B1
(45) Date of Patent: Mar. 31, 2020

(54) BOLT FOR FASTENING TWO SURFACES WITH DRAINAGE FEATURE

(71) Applicant: Louis Sardo, Gardena, CA (US)

(72) Inventor: Louis Sardo, Gardena, CA (US)

( * ) Notice: Subject to any disclaimer, the term of this patent is extended or adjusted under 35 U.S.C. 154(b) by 298 days.

(21) Appl. No.: 15/805,334

(22) Filed: Nov. 7, 2017

(51) Int. Cl.
*F16B 35/00* (2006.01)
*F16B 35/04* (2006.01)

(52) U.S. Cl.
CPC .................... *F16B 35/041* (2013.01)

(58) Field of Classification Search
CPC ........................................................ F16B 35/041
USPC .................... 411/395; 285/205, 208, 143.1
See application file for complete search history.

(56) References Cited

U.S. PATENT DOCUMENTS

| | | | | |
|---|---|---|---|---|
| 120,508 | A * | 10/1871 | Fletcher | |
| 2,344,056 | A * | 3/1944 | Pepersack | B64D 37/005 285/19 |
| 3,457,573 | A * | 7/1969 | Payne | B21K 1/44 411/395 |
| 3,531,142 | A * | 9/1970 | Peasley | F16L 41/14 285/39 |
| 4,613,169 | A * | 9/1986 | Engelhart | F16L 41/14 261/DIG. 75 |
| 5,086,522 | A | 2/1992 | Stofko, Sr. | |
| 5,326,071 | A | 7/1994 | Gunness | |
| 5,971,444 | A * | 10/1999 | Hawkins | H02G 3/22 285/139.2 |
| 6,430,756 | B1 * | 8/2002 | Reilly | E03D 11/16 4/252.1 |
| 7,032,254 | B1 | 4/2006 | Dong et al. | |
| 7,445,251 | B2 * | 11/2008 | Nilsen | F01M 5/002 285/303 |
| 7,554,104 | B2 * | 6/2009 | Shimada | H01L 21/68785 250/492.1 |
| 7,597,361 | B2 * | 10/2009 | Theilen | F16L 41/14 285/139.2 |
| 8,578,769 | B2 * | 11/2013 | Hucker | G01P 5/00 73/204.22 |
| 2008/0099080 | A1 | 5/2008 | Saini et al. | |
| 2009/0283525 | A1 | 11/2009 | Martinez et al. | |
| 2011/0119821 | A1 | 5/2011 | Chen | |

* cited by examiner

*Primary Examiner* — Gary W Estremsky
(74) *Attorney, Agent, or Firm* — Goldstein Law Offices, P.C.

(57) ABSTRACT

A drainage bolt having a top and a bottom, a head at the top, and a main shaft extending from the head to the bottom. The head has a flange having a top surface with a central opening. The main shaft has a threaded portion near the bottom, and a bottom opening. A drainage channel extends from the central opening to the bottom opening. Two surfaces may be joined together by the drainage bolt such that the flange rests against one of the two surfaces and a nut is tightened onto the threaded portion of the main shaft against the other of the two surfaces. Water collecting above one of the two surfaces enters the drainage channel at the central opening and exits from the bottom opening.

2 Claims, 6 Drawing Sheets

BOLT FOR FASTENING TWO SURFACES WITH DRAINAGE FEATURE

TECHNICAL FIELD

The present disclosure relates generally to a drainage bolt. More particularly, the present disclosure relates to a bolt that is configured for fastening two surfaces together while simultaneously allowing drainage to occur through the bolt.

BACKGROUND

Bolts, and other threaded fasteners, have been around for hundreds of years. Typically employed to join two surfaces together, they include a main shaft that extends through a bore in both surfaces, and is terminated on one side with a head that provides a flange surface that is larger than the bore and rests against one of the surfaces. A nut is threaded onto the main shaft opposite from the bolt until it is held tightly against the other of the two surfaces.

Many structures require drainage functionality due to environment or usage considerations. Sometimes exposure to elements requires that provisions be made in the structure to prevent water accumulation. Other times, the manner of intended usage creates a high likelihood that liquid will be spilled onto the structure, and must be drained away to prevent damage or deterioration thereof.

When drainage must occur through two surfaces, a simple drain hole through both surfaces will not suffice. Doing so creates a significant likelihood that water will accumulate and become trapped between the surfaces. If those surfaces contain an oxidizable metal, rapid deterioration through rusting can occur.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a bolt with an incorporated drainage feature. Accordingly, the present disclosure provides a drainage bolt that has a main shaft, a head, and a drainage channel that extends fully longitudinally through the main shaft, from a central opening in the head to a bottom opening.

It is another aspect of an example embodiment in the present disclosure to provide a drainage bolt that does not require simultaneous access to both above and below the surfaces to facilitate fastening and removal. Accordingly the bottom opening has a shaped segment that facilitates holding the bolt in a steady axial position as a nut is being fastened or unfastened from the main shaft immediately adjacent thereto. Thus, the bolt can be fastened or unfastened by a technician while below the surfaces without requiring that the head of the bolt be held by another technician above the surfaces.

Accordingly, the present disclosure describes a drainage bolt having a top and a bottom, a head at the top, and a main shaft extending from the head to the bottom. The head has a flange having a top surface with a central opening. The main shaft has a threaded portion near the bottom, and a bottom opening. A drainage channel extends from the central opening to the bottom opening. Two surfaces may be joined together by the drainage bolt such that the flange rests against one of the two surfaces and a nut is tightened onto the threaded portion of the main shaft against the other of the two surfaces. Water collecting above one of the two surfaces enters the drainage channel at the central opening and exits from the bottom opening.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
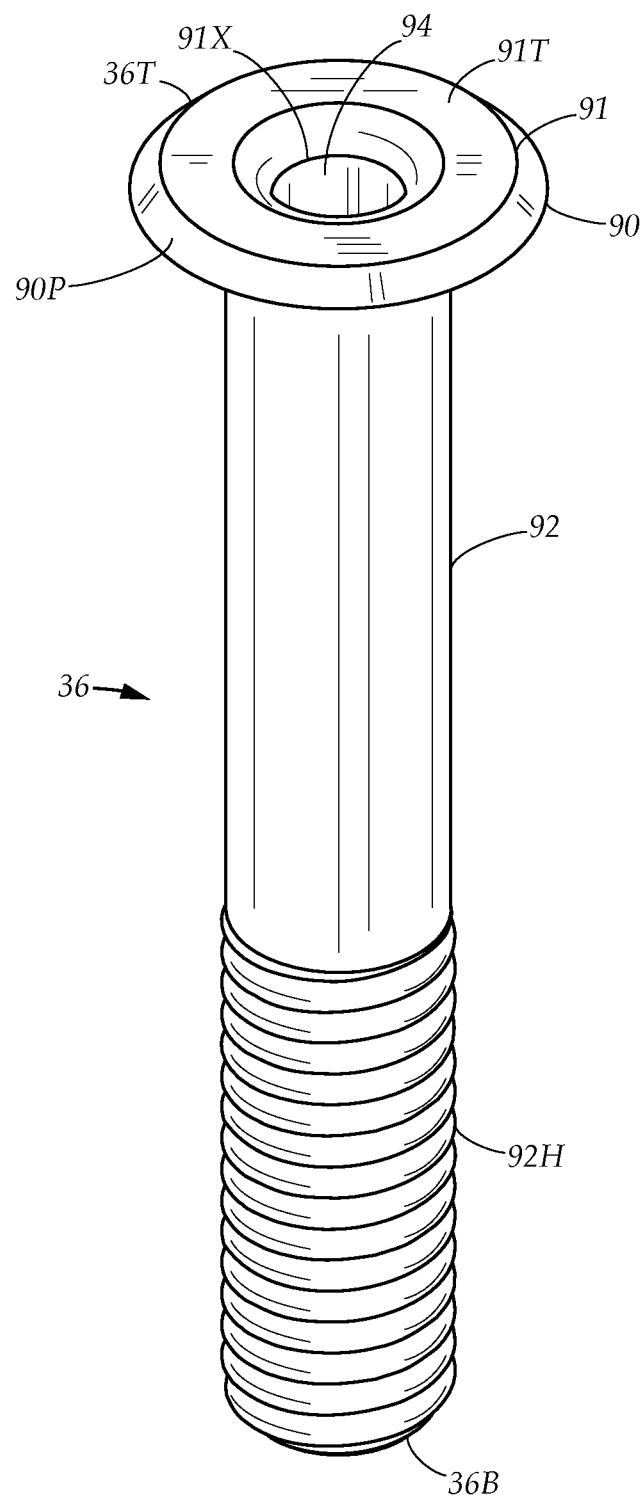
FIG. 1 is diagrammatic perspective view, illustrating a drain bolt according to the present disclosure, shown generally from above.
Figure 2:
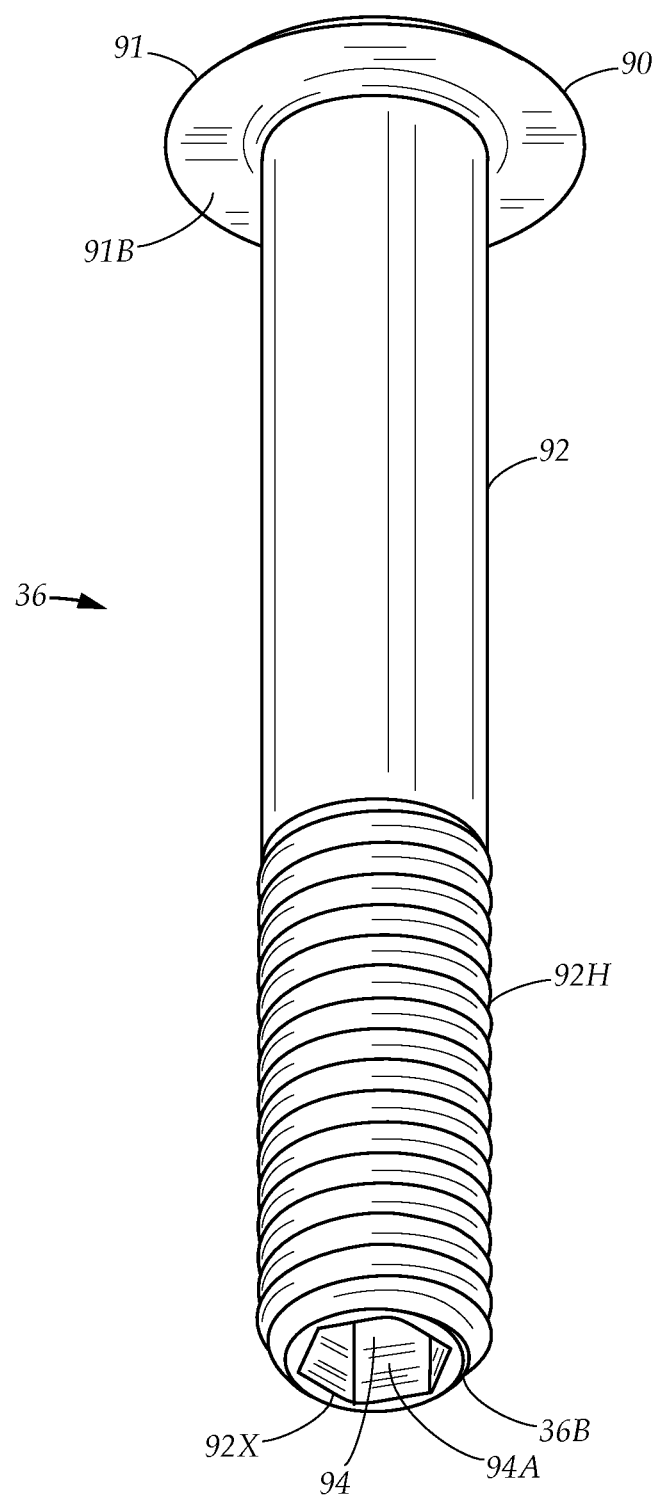
FIG. 2 is a diagrammatic perspective view, similar to FIG. 1, except shown generally from below.

FIG. 1 and FIG. 2 illustrate a drain bolt 36. The drain bolt 36 has a head 90 having a flange 91, a main shaft 92, a top 36T and a bottom 36B. The flange 91 has a flat bottom surface 91B and a low profile top surface 91T having a central opening 91X, and the main shaft 92 has a bottom opening 92X. The head 90 has an outer perimeter 90P that is beveled inwardly between the top surface 91T of the flange 91 and the bottom surface 91B of the flange 91. A drainage channel 94 extends axially through the drain bolt 36, fully between the central opening 91X and the bottom opening 92X, between the top 36T and bottom 36B. The drainage channel 94 is large enough to allow water to drain smoothly therethrough without accumulating as droplets. Accordingly, the drainage channel 94 is preferably at least one-eighth inch in diameter. The main shaft 92 has an externally threaded portion 92H toward the bottom 36B. The drainage channel 94 also includes a shaped segment 94A near the bottom 36B (also see FIG. 4) which is not cylindrical to facilitate engaging the bottom 36B with a tool to prevent the drain bolt 36 from rotating axially. For example, the shaped segment 94A may be a hexagonally shaped opening, sized and shaped to allow an Allen key to be inserted through the bottom opening 92X to hold the drain bolt 36 in position as it is being secured.

Figure 3:
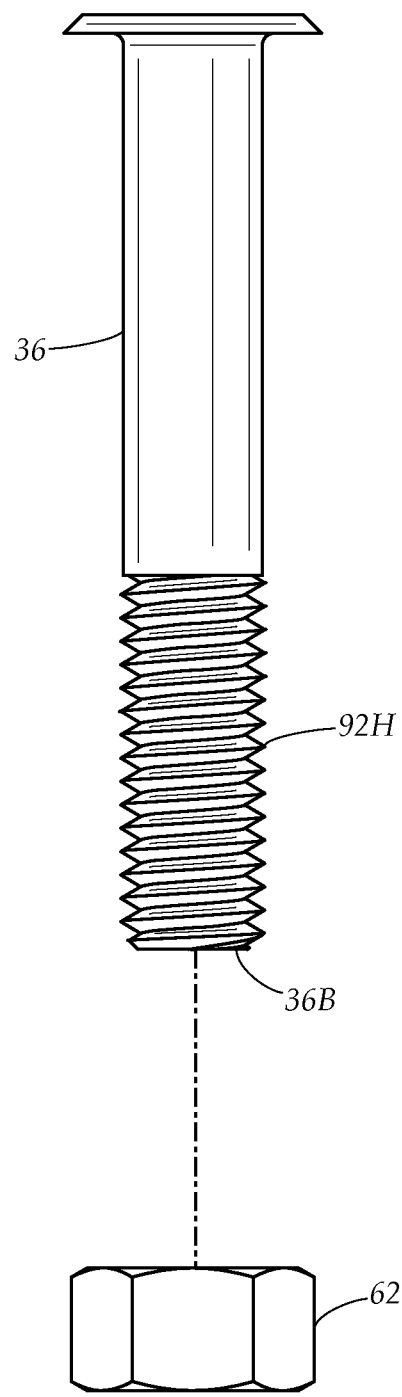
FIG. 3 is a side elevational view, illustrating the drain bolt paired with a nut for securing onto a threaded portion of the drain bolt.

Referring to FIG. 3, that drain bolt 36 is configured to operate in conjunction with a nut 62. The nut is internally threaded with the nominal thread diameter and the same diametric pitch so that it can be easily screwed onto the bottom 36B of the drain bolt 36 and threaded onto the threaded portion 92H thereof.

Figure 5:
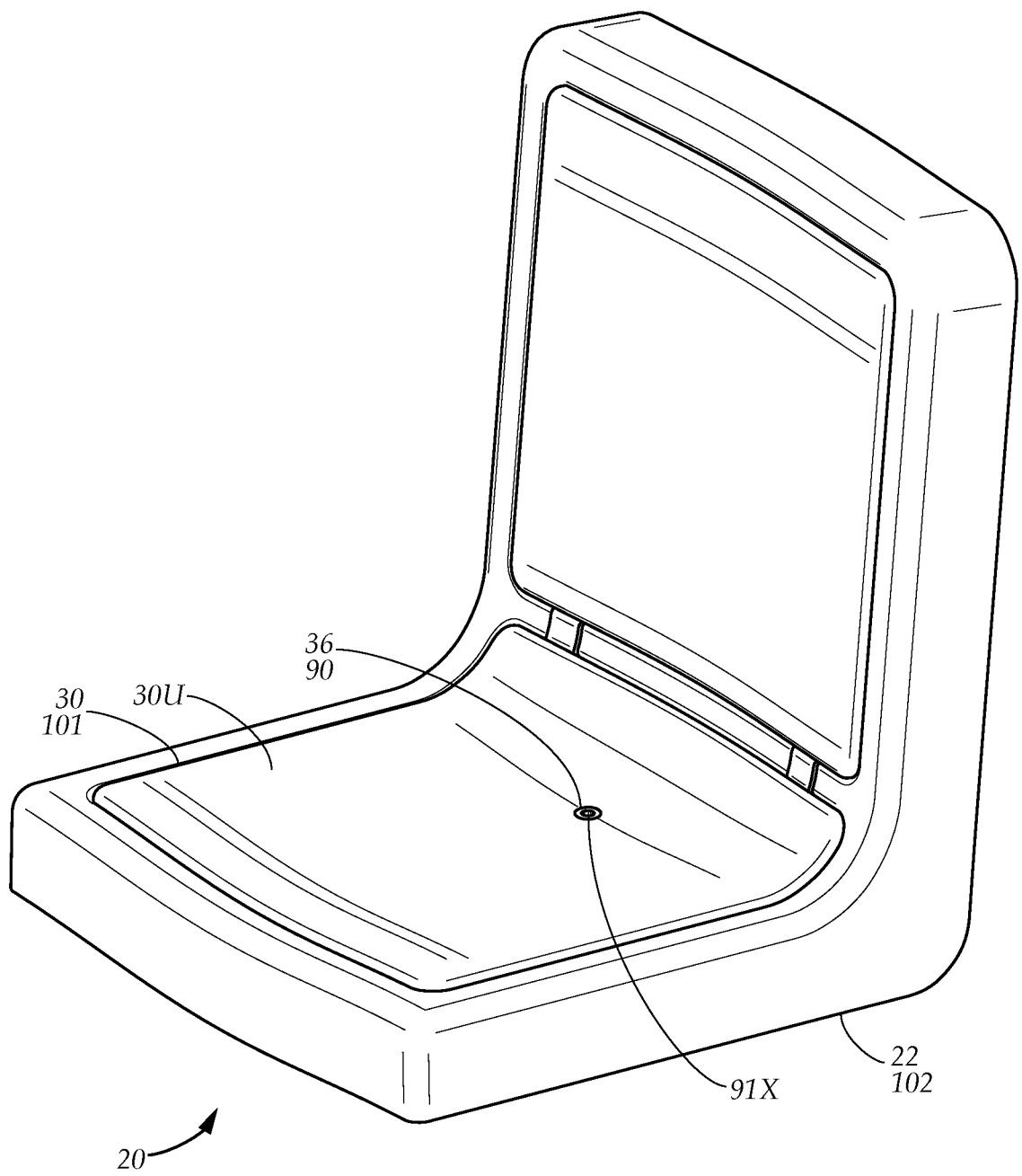
FIG. 5 is a diagrammatic perspective view, illustrating an example application of the drain bolt, providing drainage for a seating unit that includes an upper and lower surface.
Figure 6:
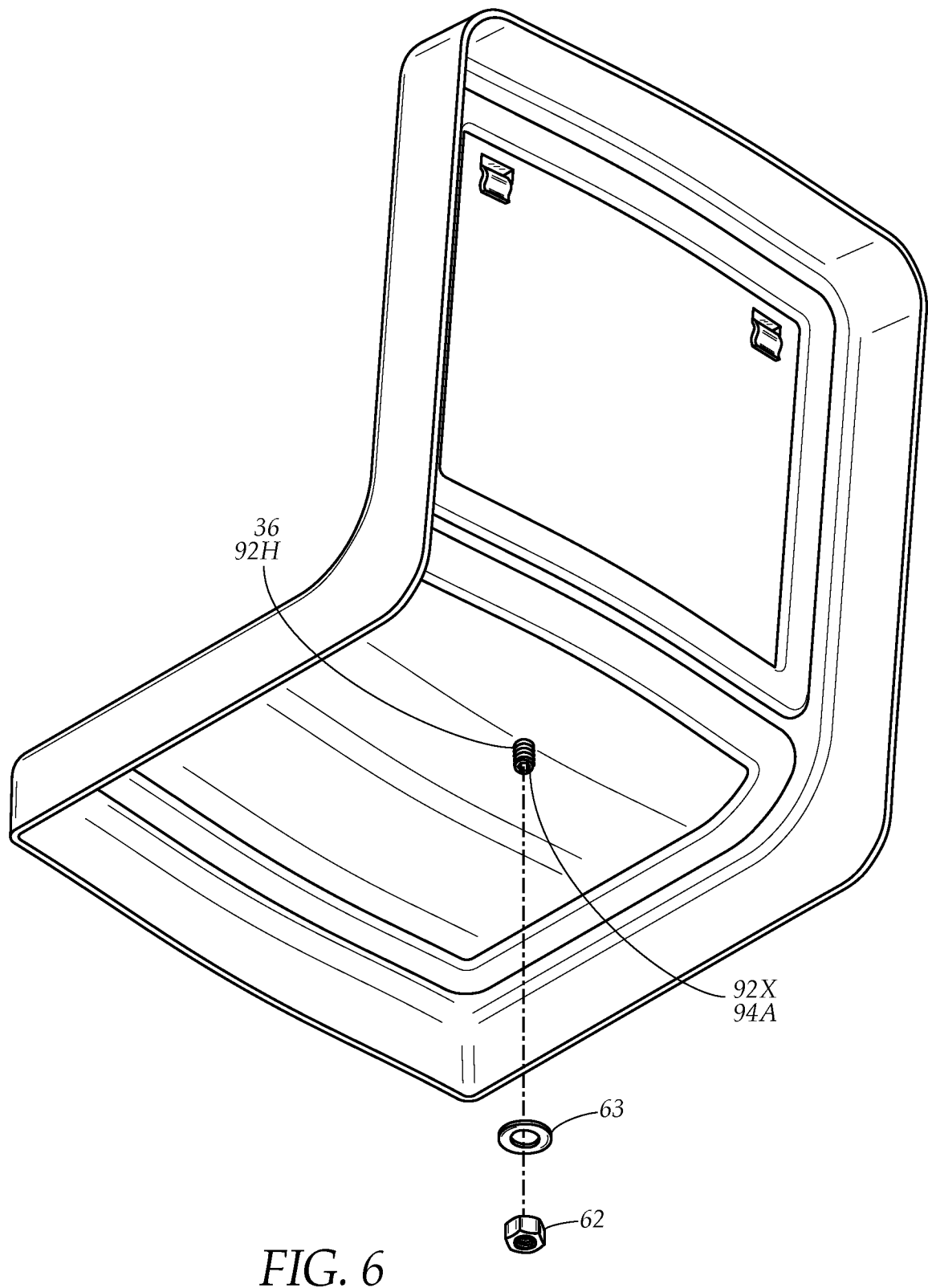
FIG. 6 is a diagrammatic perspective view, showing the seating unit of FIG. 5, except from below, illustrating the fastening of the surfaces together by securing the drainage bolt with a nut.

FIG. 5 and FIG. 6 show an embodiment that provides a sample application for the drain bolt 36. In particular, a seating unit 20 includes a frame 22 and a seating insert 30. The seating insert 30 is installed on the frame 22. Note that in this example, the insert 30 may be considered a first, upper surface 101; and the frame 22 may be considered a second, lower surface 102. The seating insert 30 has a concave upper surface 30U where water would tend to collect. The drainage bolt 36 is suitably located to extend through both the seating insert 30 and the frame 22, with the head 90 protruding slightly above the upper surface 30U, so that such water is directed toward the central opening 91X of the head 90. Below the frame 22, the drainage bolt 36 is fastened with the nut 62. Optionally a washer 63 is interposed between the nut 62 and frame 22. The nut 62 and washer 63 are tightened upwardly against the seat frame 22. To facilitate fastening the nut 62 onto the threaded portion 92H of the drain bolt 36, a tool may be inserted into the bottom opening 92X to engage the shaped segment 94A and hold the drain bolt 36 securely to prevent axial rotation thereof as the nut 62 is tightened.

Figure 4:
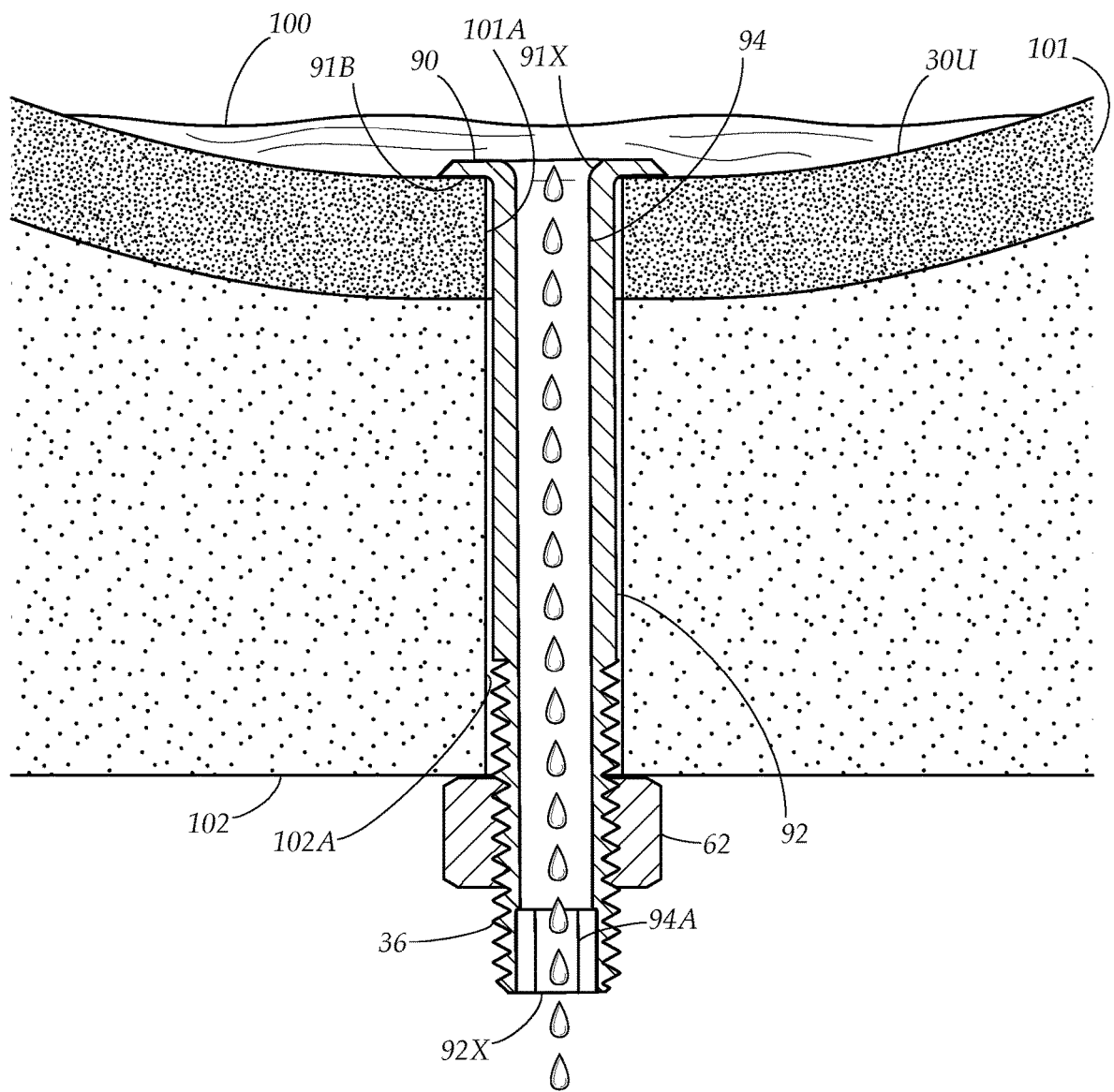
FIG. 4 is a side elevational view with parts broken away, illustrating two surfaces joined together with the drain bolt, wherein water collecting above the upper, first surface is being channeled to below the lower, second surface through the drainage channel

In addition, referring to FIG. 4, as water 100 begins to collect near the upper surface 30U of the seat insert 30 (first upper surface 101), it will drain through the seat frame 22 (second lower surface 102) by travelling through the drainage channel 94 by entering the central opening 91X in the head 90 of the drain bolt 36. The water then exits below the seat frame 22 (second lower surface 102) through the bottom opening 92X. Accordingly, the drain bolt 36 not only secures the seat insert 30 to the seat frame 22, but it provides an effective drainage conduit to prevent water from collecting on the upper surface 30U of the seat insert 30. To facilitate drainage, and prevent water from collecting on upper surface 30U of the seat insert 30, the flat bottom surface 91B of the drain bolt 36 rest flush against the upper surface 30U of the seat insert 30, and the head 90 is relatively thin so that even a slight collection of water will exceed the height of the head 90 and enter the central opening 91X.

Note also that FIG. 4 illustrates the first upper surface 101 joined to the second lower surface 102 by the drain bolt 36. The drain bolt 36 has an outer diameter of the main shaft 92. The first upper surface 101 has a first bore 101A that is substantially the same in diameter as the outer diameter of the main shaft 92. The second lower surface 102 has a second bore 102A that is substantially the same in diameter as the outer diameter of the main shaft 92. The drain bolt 36 extends through the first bore 101A and second bore 102A such that the head 90 is resting against the first upper surface 101, and the nut 62 is fastened tight against the second lower surface 102. Also note that a sealant may be used between the flat bottom surface 91B of the head 90 and the first upper surface 101. With this arrangement, water 100 collecting above the first upper surface 101 is channeled directly to below the second lower surface 102 without leaking and becoming trapped between the first upper surface 101 and second lower surface 102.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a drainage bolt. The disclosure is illustrated by example in the drawing figures, and throughout the written description. It should be understood that numerous variations are possible, while adhering to the inventive concept. Such variations are contemplated as being a part of the present disclosure.

What is claimed is:

1. A drainage bolt assembly, comprising:
   a first surface;
   a second surface;
   a drainage bolt having a top and a bottom, the drainage bolt having a head at the top and a main shaft extending from the head to the bottom, the drainage bolt having a flange, the flange having a flat bottom surface and a top surface having a central opening, the main shaft having a bottom opening at the bottom, and a drainage channel extending from the central opening in the head to the bottom opening; and
   a nut threaded onto the externally threaded portion of the drainage bolt;
   wherein:
   the drainage bolt extends through the first surface and second surface with the flange against the first surface, wherein the nut is threaded onto the externally threaded portion and tightened against the second surface, and wherein water collecting above the first surface can enter the central opening and travel through the drainage channel to exit from the bottom opening below the second surface;
   the drainage channel has a shaped segment near the bottom opening that is adapted to allow a tool to be inserted into the bottom opening to prevent the drainage bolt from rotating while a nut is fastened onto the threaded portion; and
   the shaped segment is hexagonally shaped and wherein the flange has an outer perimeter that is beveled inwardly from the flat bottom surface.

2. The drainage bolt assembly as recited in claim 1, wherein the drainage channel is at least one-eighth inch in diameter.

\* \* \* \* \*